United States Patent
Feng et al.

(10) Patent No.: US 12,553,515 B2
(45) Date of Patent: Feb. 17, 2026

(54) LUBRICATION SYSTEM FOR CONTINUOUS HIGH-POWER TURBINE FRACTURING EQUIPMENT

(71) Applicant: YANTAI JEREH PETROLEUM EQUIPMENT & TECHNOLOGIES CO., LTD., Shandong (CN)

(72) Inventors: Xiaoyu Feng, Shandong (CN); Dawei Zhao, Shandong (CN); Liang Lv, Shandong (CN); Yongcheng Liu, Shandong (CN); Zhongzhang Ma, Shandong (CN); Sheng Chang, Shandong (CN); Shanwu Fu, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 435 days.

(21) Appl. No.: 17/900,295

(22) Filed: Aug. 31, 2022

(65) Prior Publication Data

US 2023/0048551 A1     Feb. 16, 2023

Related U.S. Application Data

(63) Continuation-in-part of application No. PCT/CN2022/092238, filed on Mar. 10, 2022, and a
(Continued)

(51) Int. Cl.
*F16H 57/04*     (2010.01)
*E21B 4/00*      (2006.01)
(Continued)

(52) U.S. Cl.
CPC ......... *F16H 57/0434* (2013.01); *E21B 4/003* (2013.01); *F04B 53/18* (2013.01);
(Continued)

(58) Field of Classification Search
CPC ............ F16H 57/0412; F16H 57/0404; F16H 57/0434; F16H 57/0435; F16H 57/0439;
(Continued)

(56) References Cited

U.S. PATENT DOCUMENTS

| 2,350,102 A | 5/1944 | Fairbanks |
| 2,535,703 A | 12/1950 | Smith et al. |

(Continued)

FOREIGN PATENT DOCUMENTS

| CN | 201810502 U | 4/2011 |
| CN | 103007617 A | 4/2013 |

(Continued)

OTHER PUBLICATIONS

Chinese Search Report dated Oct. 25, 2022 for Chinese Application No. 202210240946.X; 3 pages.
(Continued)

*Primary Examiner* — Minh Truong
(74) *Attorney, Agent, or Firm* — Crowell & Moring LLP

(57) ABSTRACT

A lubricating system is disclosed. The lubricating system includes: at least one first to-be-lubricated component, wherein an inlet of each of the at least one first to-be-lubricated component is connected with a first lubrication oil inlet pipe, and an outlet of the each of the at least one first to-be-lubricated component is connected with a first lubrication oil outlet pipe; and at least one second to-be-lubricated component, wherein an inlet of each of the second to-be-lubricated component is connected with a second lubrication oil inlet pipe, and an outlet of the each of the at least one second to-be-lubricated component is connected with a second lubrication oil outlet pipe. An operating pressure of the each of the at least one first to-be-lubricated component is different from a working pressure of the each of the at least one second to-be-lubricated component.

15 Claims, 7 Drawing Sheets

Related U.S. Application Data continuation-in-part of application No. 17/558,633, filed on Dec. 22, 2021, now Pat. No. 11,920,584, which is a continuation-in-part of application No. 17/210,032, filed on Mar. 23, 2021, now Pat. No. 11,873,803, which is a continuation of application No. 16/816,262, filed on Mar. 12, 2020, now Pat. No. 10,961,993.

(51) Int. Cl.
    *F04B 53/18*     (2006.01)
    *F16H 57/02*     (2012.01)

(52) U.S. Cl.
    CPC ..... *F16H 57/0412* (2013.01); *F16H 57/0441* (2013.01); *F16H 2057/02073* (2013.01); *F16H 57/0404* (2013.01)

(58) Field of Classification Search
    CPC .. F16H 57/0441; F16H 57/0413; E21B 4/003; F04B 53/18
    See application file for complete search history.

(56) References Cited

U.S. PATENT DOCUMENTS

| | | | | |
|---|---|---|---|---|
| 5,299,657 | A * | 4/1994 | Hikes | F16N 39/06 |
| | | | | 184/104.1 |
| 8,801,394 | B2 | 8/2014 | Anderson | |
| 9,133,927 | B2 * | 9/2015 | Jarvinen | F16H 57/0456 |
| 9,618,154 | B2 * | 4/2017 | Uusitalo | F16N 7/385 |
| 10,280,725 | B2 | 5/2019 | Jiang | |
| 10,961,993 | B1 * | 3/2021 | Ji | F04B 53/18 |
| 10,989,180 | B2 | 4/2021 | Yeung et al. | |
| 11,566,748 | B2 * | 1/2023 | Bayyouk | F16N 39/00 |
| 2009/0191060 | A1 * | 7/2009 | Bagepalli | F03D 80/70 |
| | | | | 184/6.12 |
| 2010/0000475 | A1 * | 1/2010 | Kardos | F01M 5/005 |
| | | | | 123/41.31 |
| 2013/0074628 | A1 * | 3/2013 | Uusitalo | F16H 57/0435 |
| | | | | 74/467 |
| 2014/0048268 | A1 | 2/2014 | Chandler | |
| 2014/0237966 | A1 | 8/2014 | Chin | |
| 2014/0250845 | A1 | 9/2014 | Jackson et al. | |
| 2014/0334955 | A1 * | 11/2014 | Kim | F04B 39/02 |
| | | | | 417/447 |
| 2015/0252661 | A1 | 9/2015 | Glass | |
| 2016/0177945 | A1 | 6/2016 | Byrne | |
| 2016/0369609 | A1 | 12/2016 | Morris | |
| 2017/0037717 | A1 | 2/2017 | Oehring | |
| 2017/0089189 | A1 | 3/2017 | Norris | |
| 2017/0370524 | A1 | 12/2017 | Wagner | |
| 2018/0045295 | A1 * | 2/2018 | Kiyokami | B60K 6/445 |
| 2018/0298731 | A1 | 10/2018 | Bishop | |
| 2018/0328157 | A1 | 11/2018 | Bishop | |
| 2018/0371969 | A1 * | 12/2018 | McCormick | F01M 5/001 |
| 2019/0063263 | A1 | 2/2019 | Davis et al. | |
| 2019/0128399 | A1 * | 5/2019 | Shin | F16H 61/0031 |
| 2019/0153843 | A1 | 5/2019 | Headrick | |
| 2019/0154020 | A1 | 5/2019 | Glass | |
| 2019/0338762 | A1 | 11/2019 | Curry et al. | |
| 2020/0223648 | A1 | 7/2020 | Herman et al. | |
| 2020/0325761 | A1 | 10/2020 | Williams | |
| 2020/0362678 | A1 | 11/2020 | Lesko | |
| 2021/0079849 | A1 | 3/2021 | Yeung et al. | |
| 2021/0087916 | A1 | 3/2021 | Zhang | |
| 2021/0148349 | A1 | 5/2021 | Nowell | |
| 2021/0207588 | A1 | 7/2021 | Yeung et al. | |
| 2022/0112947 | A1 * | 4/2022 | Vuolle-Apiala | F16H 57/0436 |
| 2023/0279993 | A1 * | 9/2023 | Jauss | F16N 39/02 |
| | | | | 184/6.21 |

FOREIGN PATENT DOCUMENTS

| | | | |
|---|---|---|---|
| CN | 103629267 | A | 3/2014 |
| CN | 204611308 | U | 9/2015 |
| CN | 204647246 | U | 9/2015 |
| CN | 105972194 | A | 9/2016 |
| CN | 107208625 | A | 9/2017 |
| CN | 108443099 | A | 8/2018 |
| CN | 110485982 | A | 11/2019 |
| CN | 111188763 | A | 5/2020 |
| CN | 111206992 | A | 5/2020 |
| CN | 111536087 | A | 8/2020 |
| CN | 212202250 | U | 12/2020 |
| CN | 112833316 | A | 5/2021 |

OTHER PUBLICATIONS

Weir Oil & Gas Introduces Industry's First Continuous Duty 5000-Horsepower Pump Specifically Designed for Electric or Gas Turbine-Driven Applications by Weir Oil & Gas, GlobalNewswire, Jul. 25, 2019. https://www.globenewswire.com/news-release/2019/07/25/1888087/0/en/Weir-Oil-Gas-Introduces-Industry-s-First-Continuous-Duty-5000-Horsepower-Pump-Specifically-Designed-for-Electric-or-Gas-Turbine-Driven-Applications.html.

Search Report with Machine Translation, Feb. 19, 2023, pp. 1-4, issued in Chinese Patent Application 202210240946X, China National Intellectual Property Administration, Beijing, China.

Non-final Office Action issued in U.S. Appl. No. 18/444,051 mailed Sep. 28, 2024.

\* cited by examiner

LUBRICATION SYSTEM FOR CONTINUOUS HIGH-POWER TURBINE FRACTURING EQUIPMENT

CROSS-REFERENCE TO RELATED APPLICATIONS

The present application is based on and claims priority to Chinese Patent Application No. 202210240946.X and PCT Application No. PCT/CN2022/092238, both filed on Mar. 10, 2022 and entitled "Lubricating System." This present application is further based on and claims priority to U.S. patent application Ser. No. 17/558,633, filed on Dec. 22, 2021 and entitled "Continuous High-Power Turbine Fracturing Equipment," which is a continuation-in-part of U.S. application Ser. No. 17/210,032, filed Mar. 23, 2021, which is a continuation of U.S. application Ser. No. 16/816,262, filed Mar. 12, 2020, and issued U.S. Pat. No. 10,961,993. These prior patent applications are incorporated herein by reference in their entireties.

TECHNICAL FIELD

The present invention relates to the technical field of turbine fracturing, and specifically to a continuous high-power turbine fracturing equipment supported by a set of auxiliary lubrication components for prolonging and safeguarding its operation.

BACKGROUND

Traditional fracturing equipment used in oil and gas fields are mainly diesel-driven fracturing equipment or electric-driven fracturing equipment. With the development of science and technology, turbine engines used in aviation have also been applied on fracturing equipment. The turbine engines may be used in combination with high power plunger pumps for generating high-pressure fracturing fluid. Plunger pumps are thus vital members of such fracturing equipment. In order to prolong service life of a plunger pump and reduce wear between its various components, it is necessary to continuously lubricate these components.

Existing lubricating system requires relatively complex operations incurring high manufacturing cost and use cost. Interplay between heat dissipation and need for heating of the lubrication oil in some situations (e.g., during winter startup) have not be utilized in designing a versatile, adaptive, and intelligent lubrication control system. Current systems are in efficient and fragile.

A continuous high-power output turbine fracturing equipment supported by a lubrication system with improved architecture, safety, and operational efficiency is needed to satisfy the current demands of well sites in oil and gas fields.

SUMMARY

To overcome the deficiencies in the existing technologies, an objective of the present invention is to provide a continuous high-power turbine fracturing equipment, in which chassis T1 materials are selected to provide a stable working platform for the equipment; a turbine engine is arranged coaxially with a reduction gearbox, a transmission shaft is disposed between the reduction gearbox and the plunger pump, and the angle between an axis of the reduction gearbox and the transmission shaft is between 2° and 4°, ensuring stable and efficient transmission of the turbine engine, thus reducing the incidence of failure; a lubrication system is driven by an auxiliary power system to ensure that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

The objective of the present invention is achieved by the following technical measures: a continuous high-power turbine fracturing equipment, including a turbine engine, a reduction gearbox, a transmission shaft and a plunger pump, the turbine engine is arranged coaxially with the reduction gearbox, the reduction gearbox is connected to the plunger pump through the transmission shaft, and the angle between an axis of the reduction gearbox and the transmission shaft is between 2° and 4°.

Further, the power of the plunger pump is at least 5000 HP.

Further, the plunger pump is a five-cylinder plunger pump.

Further, the continuous high-power turbine fracturing equipment includes a chassis, the turbine engine, the reduction gearbox, the transmission shaft and the plunger pump are disposed on the chassis, and T1 high strength structure steel is employed as the material of the chassis.

Further, the number of axles of the chassis is 3 or above.

Further, the continuous high-power turbine fracturing equipment includes an auxiliary power system and a lubrication system. The auxiliary power system provides power to the lubrication system, the lubrication system includes a lubrication unit for the turbine engine, a lubrication unit for the reduction gearbox and a lubrication unit for the plunger pump. The lubrication unit for the plunger pump includes a high-pressure lubrication unit and a low-pressure lubrication unit.

Further, the high-pressure lubrication unit includes a high-pressure motor, a high-pressure pump and a high-pressure oil line. The high-pressure motor drives the high-pressure pump, which pumps high-pressure lubricating oil into the high-pressure oil line.

Further, the high-pressure oil line is used for lubricating connecting rod bearing bushes and crosshead bearing bushes in the plunger pump.

Further, the low-pressure lubrication unit includes a low-pressure motor, a low-pressure pump and a low-pressure oil line. The low-pressure motor drives the low-pressure pump, which pumps low-pressure lubricating oil into the low-pressure oil line.

Further, the low-pressure oil line is used for lubricating crankshaft bearings, crosshead sliding rails, bearings of the reduction gearbox and gears of the reduction gearbox in the plunger pump.

Further, at oil inlets of the low-pressure oil line, independent lubricating oil lines are respectively arranged for bearings of the reduction gearbox and gears of the reduction gearbox.

Further, the auxiliary power system is a diesel engine, or a gas turbine, or an electromotor.

Further, the auxiliary power system is disposed on a gooseneck of the chassis.

Further, there is a torque limiter disposed on the reduction gearbox, ensuring the torque not too large to damage the turbine engine.

Further, the turbine engine employs 100% of natural gas or diesel as fuel.

Further, the continuous high-power turbine fracturing equipment includes an air intake system, which includes air intake filters and air intake pipings, the air intake filters are connected to the air inlet of the turbine engine through the air intake pipings.

Further, the air intake filters are in V-shaped structures.

Further, the continuous high-power turbine fracturing equipment includes an exhaust system, which is connected to the exhaust port of the turbine engine.

Further, there is a rain cap disposed at the exhaust end of the exhaust system, the rain cap is hinged to the exhaust end of the exhaust system and an opening of the rain cap diverges from the turbine engine.

Further, after obtaining the power provided by an electric capstan, the rain cap rotates along the exhaust end of the exhaust system with a rotation angle between 0° and 90°.

Further, the rotation angle of the rain cap is 85°.

Compared with the prior art, the present invention has the following beneficial effects: providing a continuous high-power turbine fracturing equipment, in which chassis T1 materials are selected to provide a stable working platform for the equipment; the turbine engine is arranged coaxially with the reduction gearbox, the transmission shaft is disposed between the reduction gearbox and the plunger pump, and the angle between an axis of the reduction gearbox and the transmission shaft is between 2° and 4°, ensuring stable and efficient transmission of the turbine engine, thus reducing the incidence of failure; a lubrication system is driven by an auxiliary power system to ensure that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

In another aspect of this disclosure, a lubricating system is provided, for accurately and efficiently realize effective lubrication of the fracturing equipment above.

Some embodiments of the disclosure provide a lubricating system. The lubricating system includes: at least one first to-be-lubricated member, wherein an inlet of each of the at least one first to-be-lubricated member is connected with a first oil inlet pipe, and an outlet of the each of the at least one first to-be-lubricated member is connected with a first oil outlet pipe; and at least one second to-be-lubricated member, wherein an inlet of each of the at least one second to-be-lubricated member is connected with a second oil inlet pipe, and an outlet of the each of the at least one second to-be-lubricated member is connected with a second oil outlet pipe. A working pressure of the each of the at least one first to-be-lubricated member is different from a working pressure of the each of the at least one second to-be-lubricated member.

In some embodiments the lubricating system further includes: an oil tank, wherein the first oil inlet pipe, the first oil outlet pipe, the second oil inlet pipe and the second oil outlet pipe are all in communication with the oil tank; and a heating circuit, wherein an inlet of the heating circuit and an outlet of the heating circuit are both in communication with the oil tank.

In some embodiments, the lubricating system further includes: a first pump disposed on the first oil inlet pipe; a first driving member in drive connection with the first pump; a first controller in communication connection with the first driving member; and a first pressure sensor disposed at the inlet of the each of the at least one first to-be-lubricated member, the first pressure sensor being in communication connection with the first controller.

In some embodiments, the lubricating system further includes a first control valve disposed on the first oil inlet pipe and positioned between the first pump and an inlet of the first oil inlet pipe.

In some embodiments, the lubricating system further includes a first filtering member disposed on the first oil inlet pipe and positioned between the first control valve and the inlet of the first oil inlet pipe.

In some embodiments, the lubricating system further includes a first overflow valve disposed on the first oil outlet pipe.

In some embodiments, the working pressure of the each of the at least one first to-be-lubricated member is less than the working pressure of the each of the at least one second to-be-lubricated member; the lubricating system comprises a radiator, the radiator is disposed on the first oil inlet pipe; and the lubricating system further includes a first temperature sensor for detecting a temperature of lubricating oil in the first oil inlet pipe, the first temperature sensor being in communication connection with the radiator.

In some embodiments, the heating circuit includes: a second overflow valve; a pipe heater disposed between the second overflow valve and the outlet of the heating circuit; a second pump; a second driving member in drive connection with the second pump; a second controller in communication connection with the second driving member; and a second temperature sensor disposed in the oil tank, the second temperature sensor being in communication connection with the second controller.

In some embodiments, the lubricating system further includes a tank heater disposed in the oil tank.

In some embodiments, according to a temperature of lubricating oil detected by the second temperature sensor, opening and closing of the second overflow valve and starting and stopping of the pipe heater and the tank heater are controlled by a person or a control system.

In some embodiments, the lubricating system further includes: a third pump disposed on the second oil inlet pipe; a third driving member in drive connection with the third pump; a third controller in communication connection with the third driving member; and a second pressure sensor disposed at the inlet of the each of the at least one second to-be-lubricated member, the second pressure sensor being in communication connection with the third controller.

The lubricating system of the disclosure includes the at least one first to-be-lubricated member and the at least one second to-be-lubricated member, the working pressure of the each of the at least one first to-be-lubricated member is different from the working pressure of the each of the at least one second to-be-lubricated member, and the working pressure of the each of the at least one first to-be-lubricated member is less than the working pressure of the each of the at least one second to-be-lubricated member such that the lubricating system fully lubricates to-be-lubricated members having different pressures, insufficient lubrication caused by different lubricating oil pressures of all the to-be-lubricated members is avoided.

The present invention is illustrated in detail below with reference to accompanying drawings and the detailed description.

It is to be understood that both the foregoing general description and the following detailed description are exemplary and explanatory only, and are not necessarily restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

Labels in FIGS. 1-6 are the following: 1. chassis, 2. auxiliary power system, 3. the first hydraulic pump, 4. exhaust system, 5. air intake system, 6. turbine engine, 7. reduction gearbox, 8. transmission shaft, 9. plunger pump, 10. air intake filters, 11. rain cap, 12. electric capstan, 13. connecting rod bearing bushes, 14. crosshead bearing bushes, 15. crankshaft bearings, 16. crosshead upper sliding rails, 17. crosshead lower sliding rails, 18. reduction gearbox gear pair, 19. bearing of reduction gearbox, 20. high-pressure oil line, 21. low-pressure oil line, 22. torque limiter, 23. high-pressure pump, 24. high-pressure motor, 25. low-pressure pump, and 26. low-pressure motor.

Figure 7:
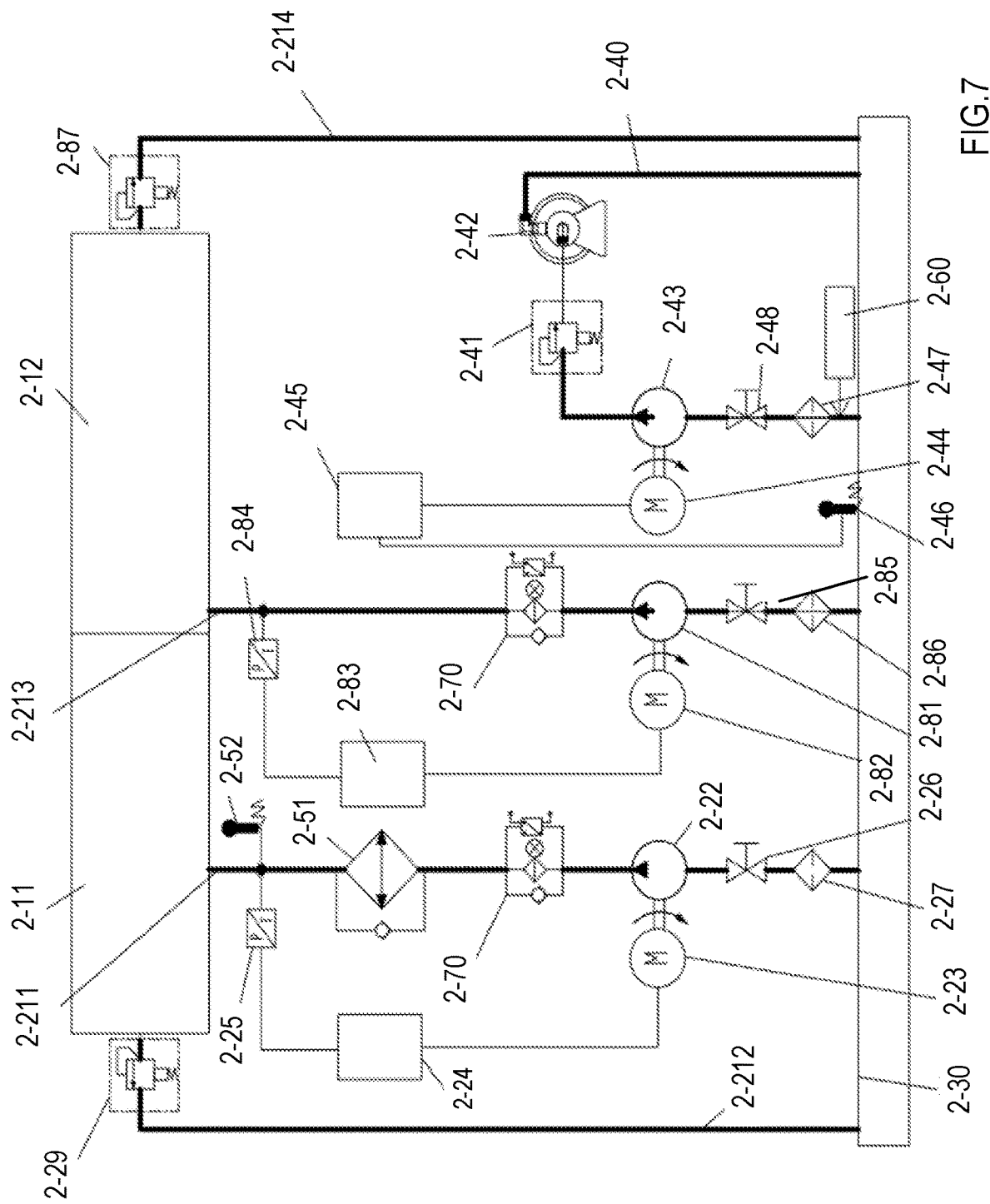
FIG. 7 illustrates a schematic diagram of another lubricating system according to some example embodiment of the present disclosure.

Labels in FIG. 7 are the following: 2-11. first to-be-lubricated member, 2-12. second to-be-lubricated member, 2-211. first oil inlet pipe, 2-212. first oil outlet pipe, 2-213. second oil inlet pipe, 2-214. second oil outlet pipe, 2-22. first pump, 2-23. first driving member, 2-24. first controller, 2-25. first pressure sensor, 2-26. first control valve, 2-27. first filtering member, 2-29. first overflow valve, 2-30. oil tank, 2-40. heating circuit, 2-41. second overflow valve, 2-42. pipe heater, 2-43. second pump, 2-44. second driving member, 2-45. second controller, 2-46. second temperature sensor, 2-47. second filtering member, 2-48. second control valve, 2-51. radiator, 2-52. first temperature sensor, 2-60. tank heater, 2-70. pipe filter, 2-81. third pump, 2-82. third driving member, 2-83. third controller, 2-84. second pressure sensor, 2-85. third control valve, 2-86. third filtering member, and 2-87. third overflow valve.

DETAILED DESCRIPTION

The technical solutions in the embodiments of the present disclosure will be described below in conjunction with the accompanying drawings in the embodiments of the present disclosure. Obviously, the described embodiments are merely examples of the embodiments of the present disclosure, rather than all of the embodiments of the present disclosure. Based on the embodiments in the present disclosure, other embodiments obtained by those having ordinary skill in the art without creative efforts shall fall within the protection scope of the present disclosure.

Hereinafter, some embodiments of the present disclosure are described in detail in conjunction with the drawings. The various embodiments and features in the various embodiments may be combined with each other unless such combination result in conflicts.

One of the purposes of the present disclosure is to provide a high and low-pressure lubrication system. The power source of the lubrication system according to some embodiments of the present disclosure can be a hydraulic motor and/or an electrical motor.

Figure 1:
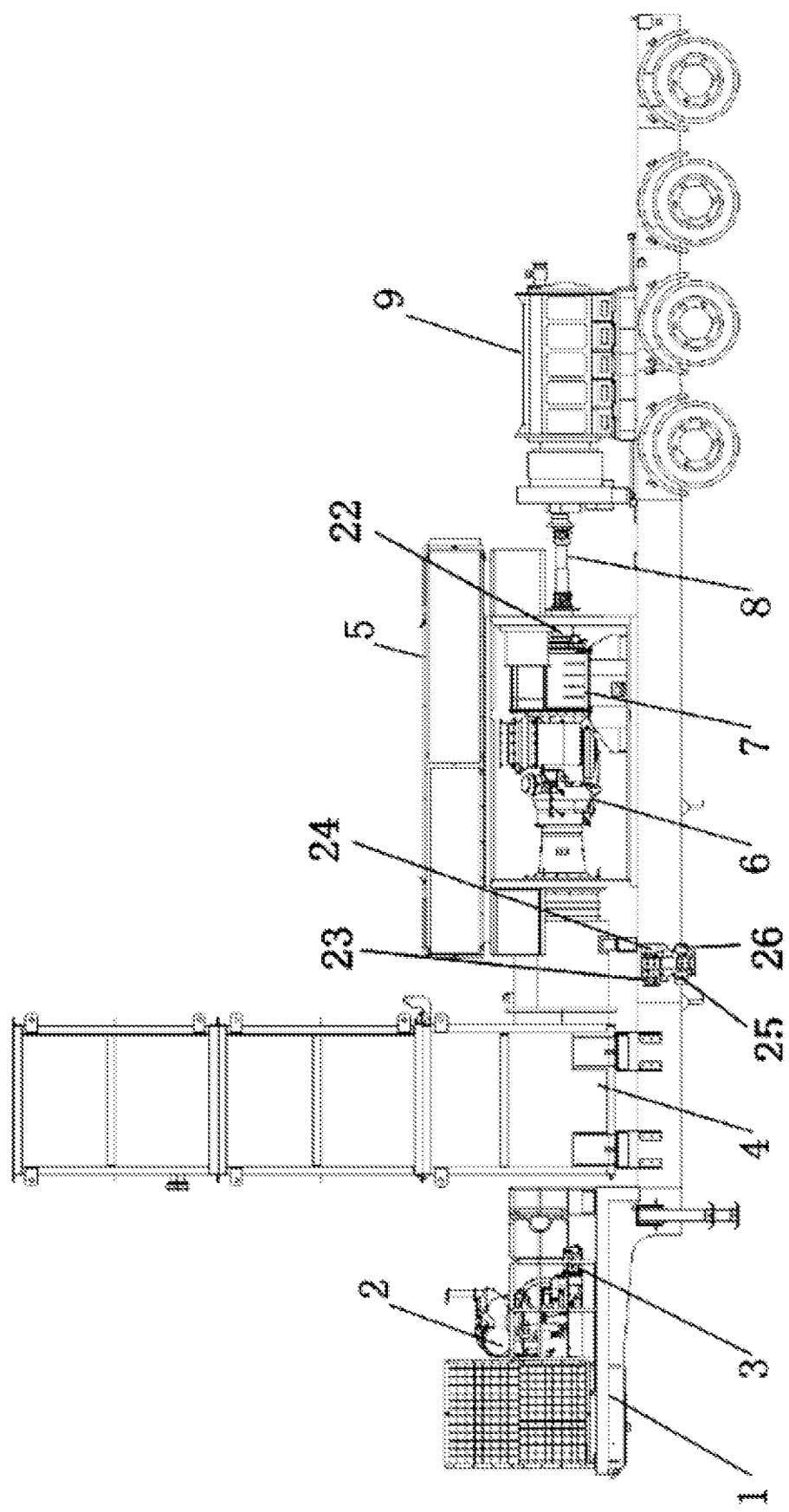
FIG. 1 is a schematic structural diagram of an example continuous high-power turbine fracturing equipment according to one embodiment of the present disclosure.
Figure 2:
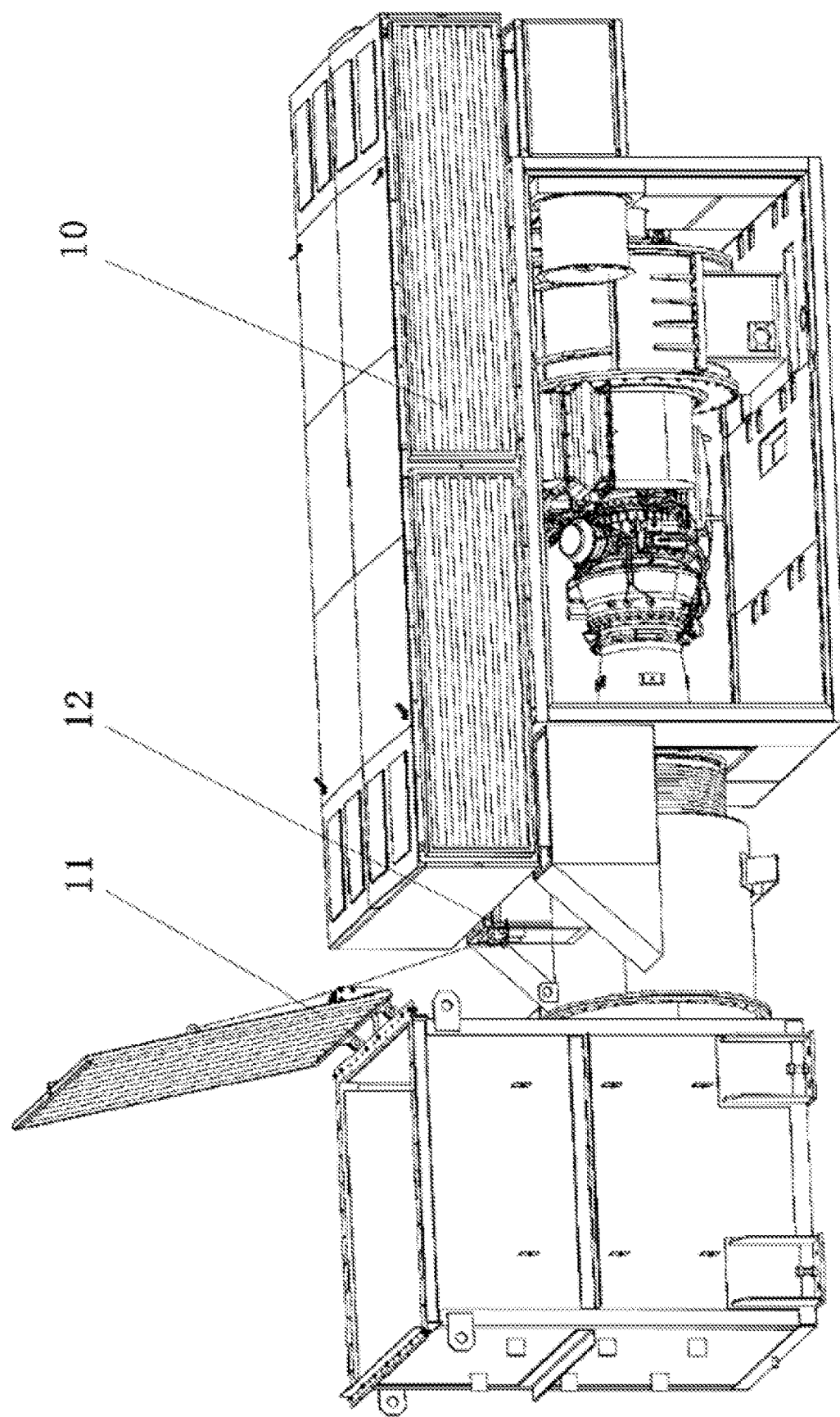
FIG. 2 is a schematic structural diagram of an example turbine exhaust system according to one embodiment of the present disclosure.
Figure 3:
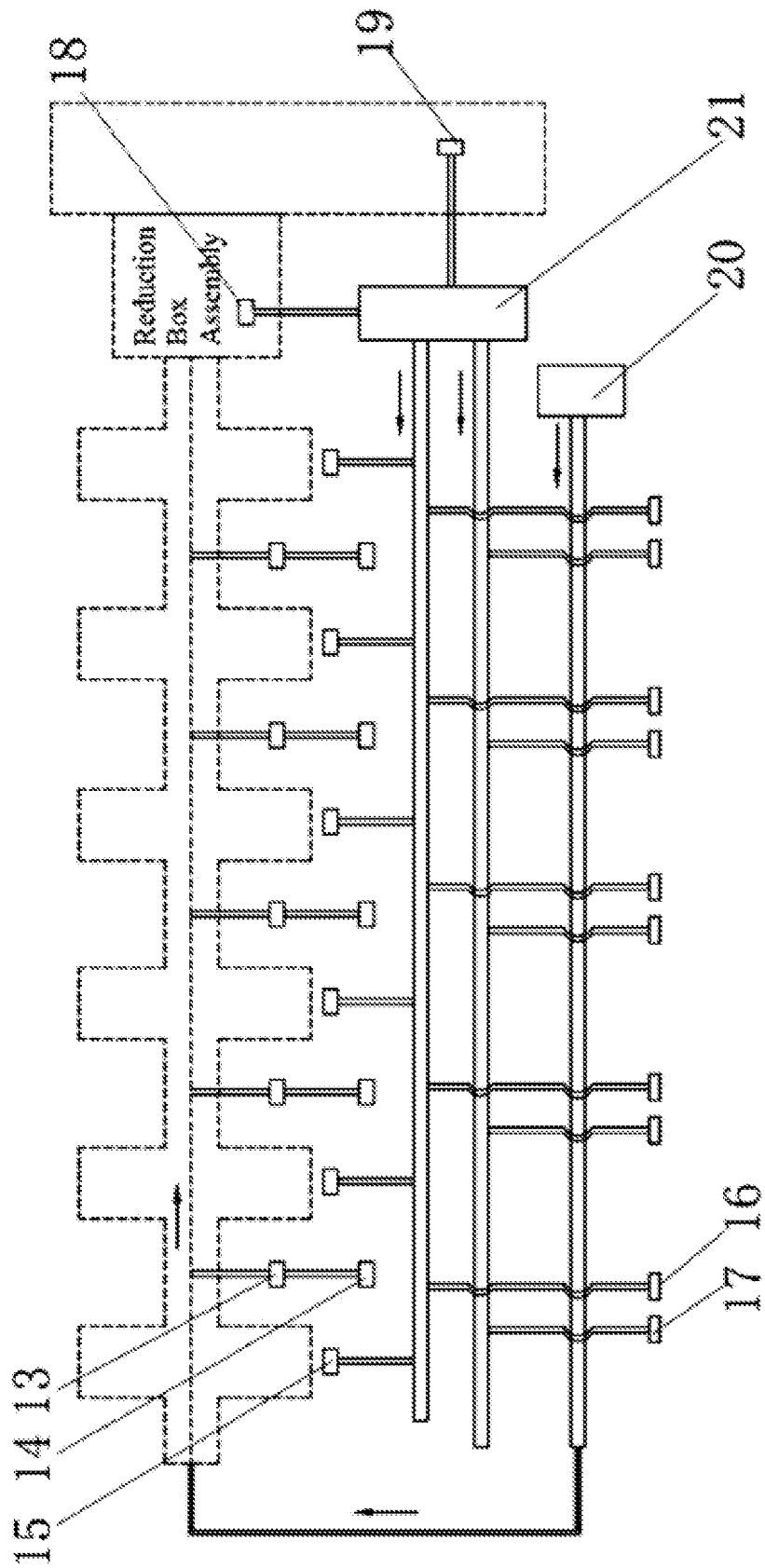
FIG. 3 is a schematic diagram of lubrication in the plunger pump according to one example embodiment of the present disclosure.

As shown in FIGS. 1 to 3, a continuous high-power turbine fracturing equipment, including a turbine engine 6, a reduction gearbox 7, a transmission shaft 8 and a plunger pump 9. The turbine engine 6 is arranged coaxially with the reduction gearbox 7. The reduction gearbox 7 is connected to the plunger pump 9 through the transmission shaft 8, and the angle between an axis of the reduction gearbox and the transmission shaft 8 is between 2° and 4°, ensuring stable and efficient transmission of power form the turbine engine 6, thus reducing the incidence of failure.

The power of the plunger pump 9 may be 5000 HP or above. The plunger pump 9 may be a five-cylinder plunger pump. The output of the high-power plunger pump 9 provides basic high-pressure fracturing fluid for the continuous high-power turbine fracturing equipment.

The continuous high-power turbine fracturing equipment includes a chassis 1. The turbine engine 6, the reduction gearbox 7, the transmission shaft 8 and the plunger pump 9 are disposed on the chassis 1. T1 high strength structure steel may be employed as the material of the chassis 1, ensuring the stability of the chassis 1, and providing a reliable working platform for the stable operations of the turbine engine 6 and the high-power plunger pump 9. The chassis, for example, may be a semi-trailer platform.

The number of axles of the chassis 1 may be 3 or above, ensuring sufficient supporting capacity.

The continuous high-power turbine fracturing equipment includes an auxiliary power system 2 and a lubrication system, the auxiliary power system 2 provides power to the lubrication system. The lubrication system includes three lubrication units, which are the lubrication unit for the turbine engine, the lubrication unit for the reduction gearbox and the lubrication unit for the plunger pump. The lubrication unit for the turbine engine is used for lubricating the turbine engine 6, whereas the lubrication unit for the reduction gearbox is used for lubricating the reduction gearbox 7, and the lubrication unit for the plunger pump includes a high-pressure lubrication sub-unit and a low-pressure lubrication sub-unit. The function of the lubrication system is to lubricate and cool the turbine engine 6, the reduction gearbox 7, and the plunger pump 9, thus ensuring their stable operations. The lubrication system includes components such as one or more coolers, one or more first hydraulic pumps 3, one or more pressure gage, one or more safety valve, and so on. The cooler cools the lubricating oil, ensuring the oil entering each lubrication unit at normal temperature to provide sufficient lubricating properties. The first hydraulic pump 3 provides power to each lubrication unit. The pressure gage is used to monitor the pressure of the lubricating oil in the whole lubrication system. The safety valve ensures stable operations of the lubrication system.

The high-pressure lubrication unit includes a high-pressure motor, a high-pressure pump and a high-pressure oil line 20. The high-pressure motor drives the high-pressure pump, which pumps high-pressure lubricating oil into the high-pressure oil line 20. The high-pressure oil line 20 is used for lubricating connecting rod bearing bushes 13 and crosshead bearing bushes 14 in the plunger pump 9. The low-pressure lubrication unit includes a low-pressure motor, a low-pressure pump and a low-pressure oil line 21. The low-pressure motor drives the low-pressure pump, which pumps low-pressure lubricating oil into the low-pressure oil line 21. The low-pressure oil line 21 is used for lubricating crankshaft bearings 15, crosshead sliding rails, bearings 19 of the reduction gearbox and gears 18 of the reduction gearbox in the plunger pump 9. The crosshead sliding rails include crosshead upper sliding rails 16 and crosshead lower sliding rails 17. By providing oil for lubrication with the dual lubricating oil line, different lubrication demands at each lubricating point in the plunger pump 9 would be satisfied. Correspondingly, two oil pumps (a high-pressure pump and a low-pressure pump) are employed to supply oil so that the oil supply of each oil line could be better independently guaranteed, thus better distributing the lubricating oil, and avoiding problems of uneven distribution of lubricating oil caused by excessive lubrication branches and insufficient amount of lubricating oil at each lubricating point, thus enhancing the utilization of lubricating oil, reducing abnormalities, and better assisting the continuous stable operations of the high-power plunger pump 9. For the connecting rod bearing bushes 13 and the crosshead bearing bushes 14, the fit clearance is small, the carried load is high, the contact area is large, and the requirements on lubrication are high. However, for the crankshaft bearings 15, the crosshead sliding rails, bearings 19 of the reduction gearbox and gears 18 of the reduction gearbox, by contrast, the requirements on lubrication are low.

At an oil inlet of the low-pressure oil line 21, independent lubricating oil lines are respectively arranged for bearings 19 of the reduction gearbox and gears 18 of the reduction gearbox. The rotation rates of the bearings 19 of the reduction gearbox and the gears 18 of the reduction gearbox are high, each of which is supplied with oil independently, which can guarantee sufficient lubricating oil for effectively establishing oil films, rapidly taking away the heat resulting from friction, and improving the life time.

A filter, an overflow valve and the like may be disposed on the respective oil supply line of the high-pressure oil line 20 and the low-pressure oil line 21. The rated lubricating oil pressure of the high-pressure oil line 20 is 200-350 PSI. The rated lubricating oil pressure of the low-pressure oil line 21 is 60-150 PSI.

The auxiliary power system 2 may be implemented as a diesel engine, or a gas turbine, or an electromotor.

The auxiliary power system 2 may be disposed on a gooseneck of the chassis 1, optimizing the configuration form of each component of the equipment on the chassis 1.

There may be a torque limiter disposed on the reduction gearbox 7, ensuring the torque not too large to damage the turbine engine 6.

The turbine engine 6 employs 100% of natural gas or diesel as fuel.

The continuous high-power turbine fracturing equipment includes an air intake system 5, which includes air intake filters 10 and air intake pipings, the air intake filters 10 are connected to the air inlet of the turbine engine 6 through the air intake pipings. The air intake system 5 is integrated on the same chassis 1, increasing the ease of use of the continuous high-power turbine fracturing equipment, reducing the transportation cost, without the need of field connection and assembly.

A chamber is disposed outside the turbine engine 6, the air intake filters 10 are disposed on the chamber, and the air intake filters 10 are in V-shaped structures, which means that the cross sections of the air intake filters 10 are in V-shapes, which are different from the existing planar structures in larger contact area, thus increasing the air intake area, decreasing the flow rate of the air inflow, extending the life time of the air intake filters 10, better matching the desired air amount of the turbine engine 6, and promoting the stable output of the turbine engine 6.

The continuous high-power turbine fracturing equipment includes an exhaust system 4, which is connected to the exhaust port of the turbine engine 6. The exhaust system 4 is integrated on the same chassis 1, increasing the ease of use of the continuous high-power turbine fracturing equipment, reducing the transportation cost, without the need of field connection and assembly.

The exhaust end of the exhaust system 4 is provided with a rain cap 11, the rain cap is hinged to the exhaust end of the exhaust system 4 and the opening of the rain cap diverges from the turbine engine 6. The exhaust end of the exhaust system 4 is in a type of opening, if it rains, the rainwater would accumulate in the exhaust system 4, more seriously flow backward into and damage the turbine engine 6. The addition of rain cap 11 can effectively avoid this. Moreover, the opening of rain cap 11 diverges from the turbine engine 6, thus preventing the discharged exhaust from being inhaled by the air intake system 5 of the turbine engine 6.

After obtaining the power provided by an electric capstan 12, the rain cap 11 rotates along the exhaust end of the exhaust system 4 with a rotation angle between 0° and 90°. The rotation angle of the rain cap 11 as illustrated in FIG. 1 is 85°. The rain cap 11 can be completely closed in non-working state or on rainy days, at 0° angle; and can be opened in working state, preferably open up to 85°, ensuring that the rain cap 11 can be opened and closed smoothly by the electric capstan 12.

Figure 4:
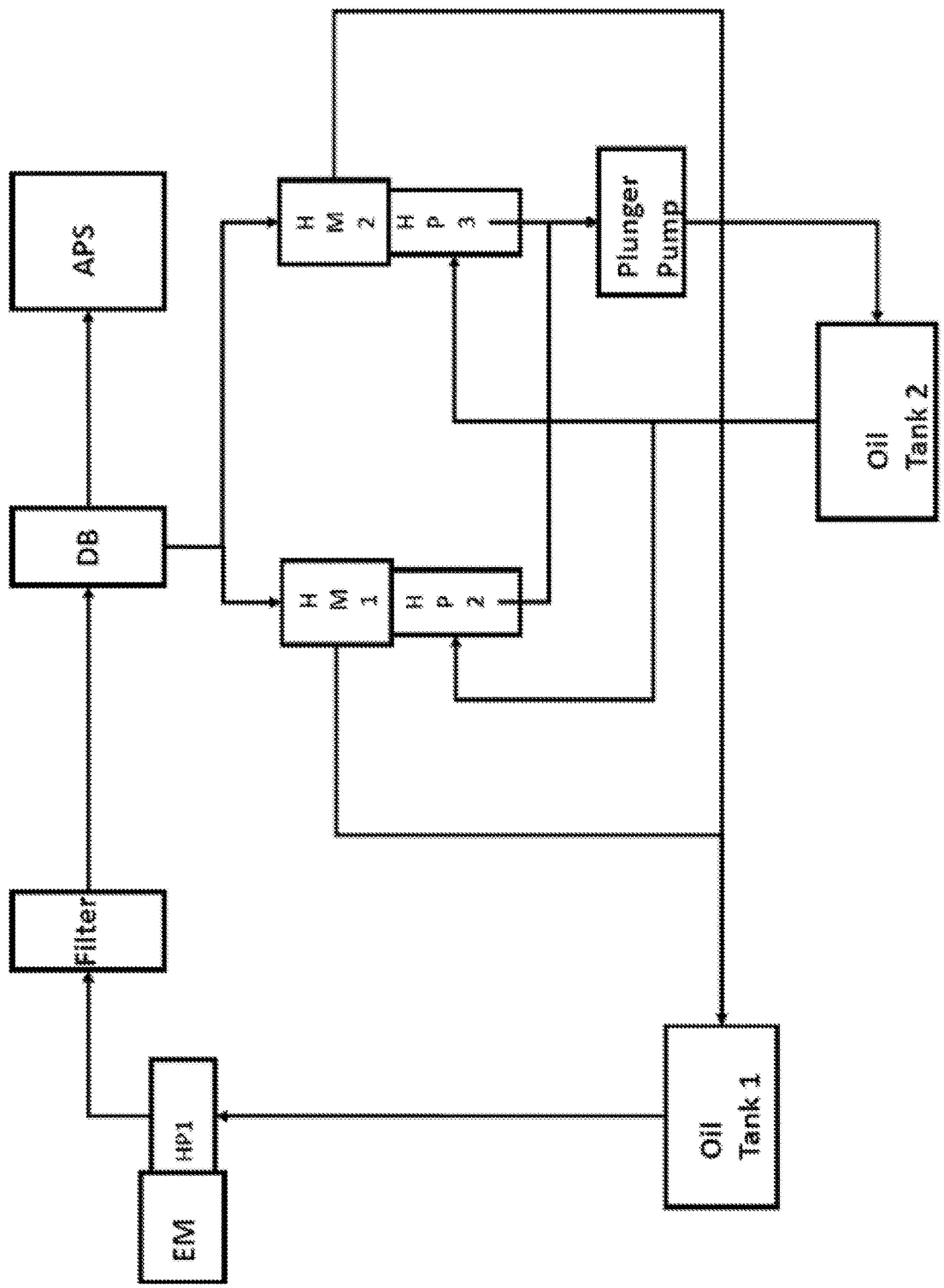
FIG. 4 is a schematic diagram of operational principle for lubrication according to one example embodiment of the present disclosure.

FIG. 4 is a schematic diagram of an example lubrication principle according to one embodiment of the present disclosure. As shown in FIG. 4, an electrical motor (EM) drives a hydraulic pump (HP) 1. The hydraulic pump 1 can provide power for the auxiliary power system (APS) of the vehicle. The hydraulic pump 1 may drive the hydraulic motor (HM) 1 and the hydraulic motor (HM) 2. The hydraulic motor 1 may drive the hydraulic pump 2, and the hydraulic motor 2 may drive the hydraulic pump 3. The hydraulic pump 2 and the hydraulic pump 3 may respectively lubricate the high and low-pressure systems of the plunger pump. A distribution block (DB) can be used on the hydraulic pipeline to divide the pipeline into two. A filter can also be used to filter the lubricating oil in the pipeline.

Figure 5:
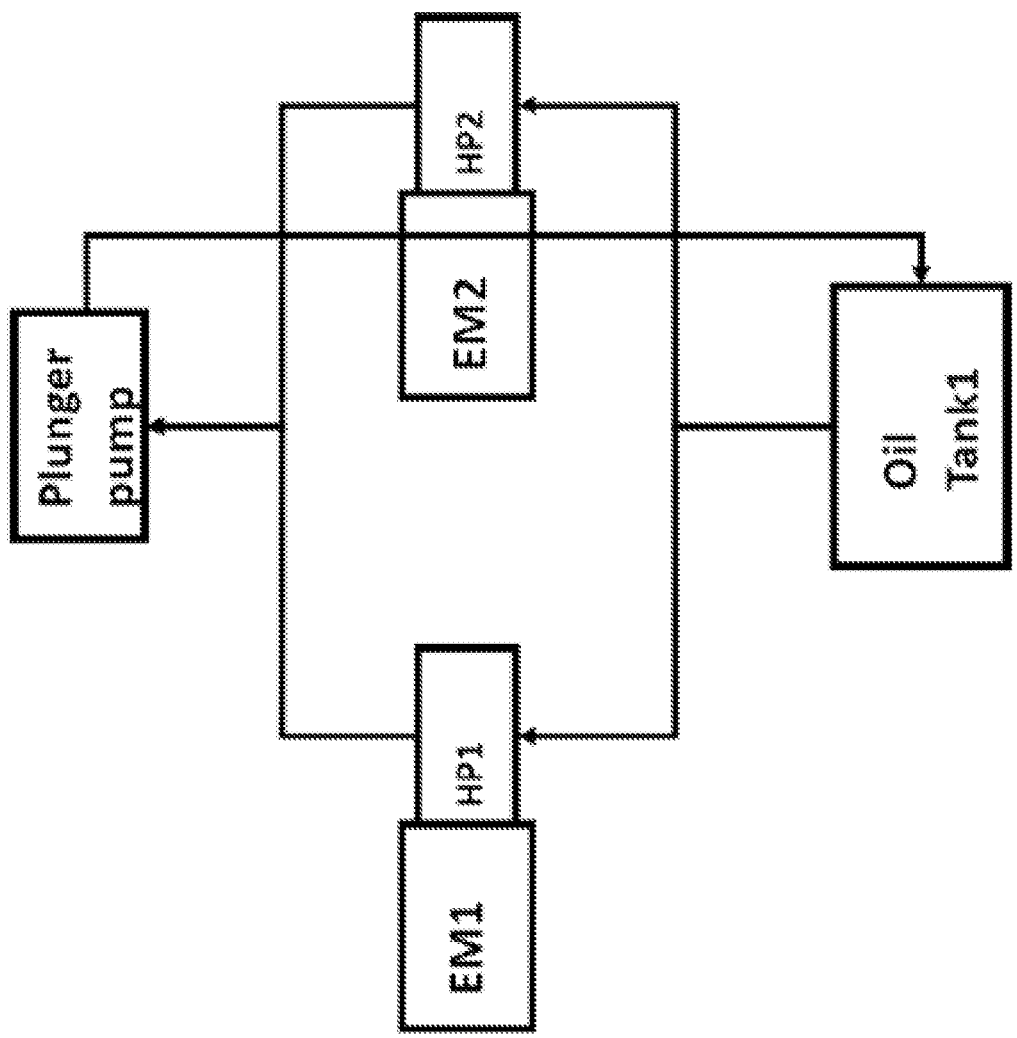
FIG. 5 is a schematic diagram of operational principle for lubrication according to another example embodiment of the present disclosure.

FIG. 5 is a schematic diagram of lubrication principle according to one embodiment of the present disclosure. As shown in FIG. 5, the electrical motor may directly drive the hydraulic pump to lubricate the plunger pump. The electrical motor (EM) 1 may drive the hydraulic pump (HP) 1, and the hydraulic pump 1 may lubricate the plunger pump high-pressure system; the electrical motor 2 may drive the hydraulic pump (HP) 2, and the hydraulic pump 2 may lubricate the plunger pump low-pressure system.

Figure 6:
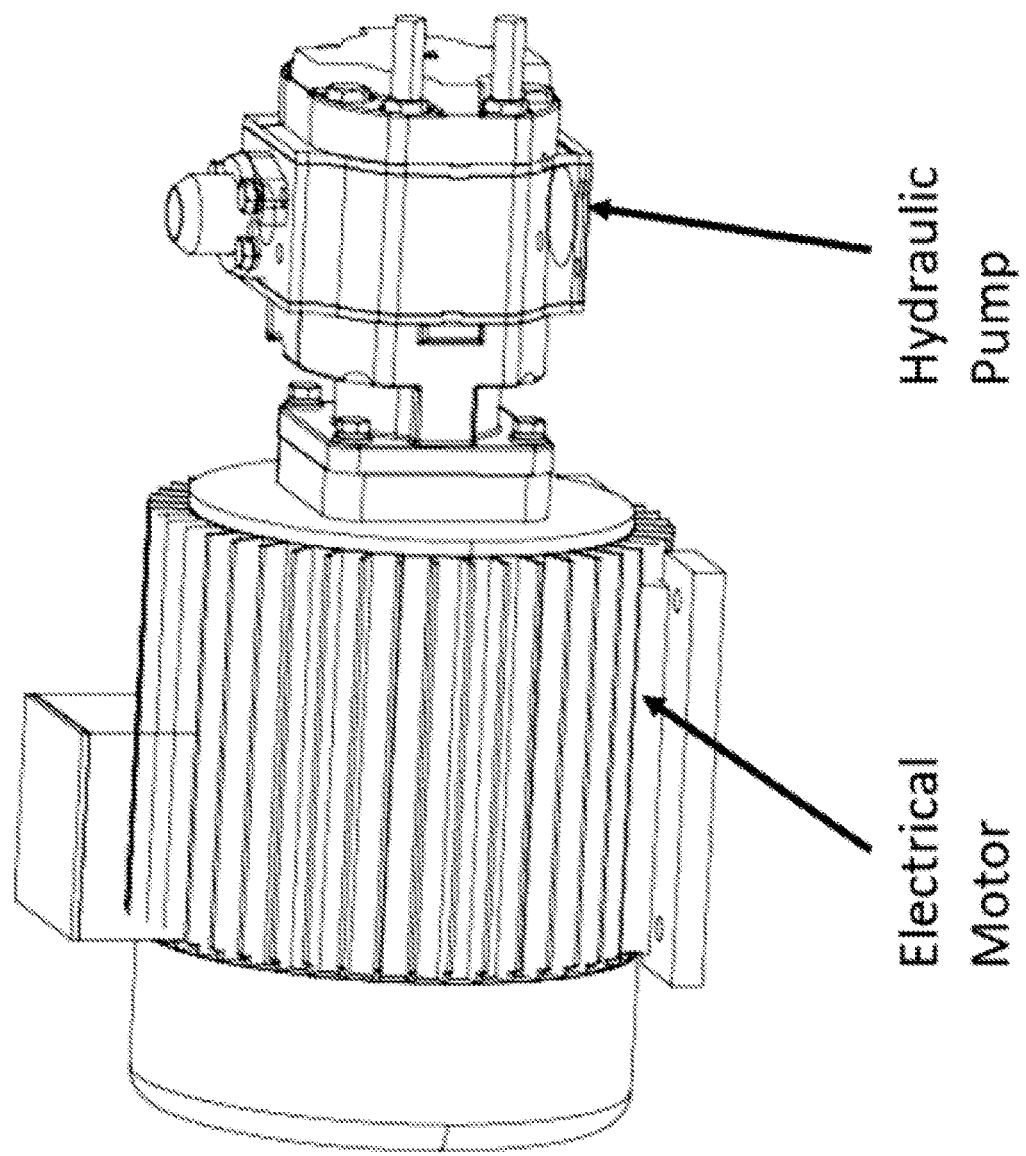
FIG. 6 is a diagram of an electrical motor and a hydraulic pump connected directly according to one example embodiment of the present disclosure.

FIG. 6 is a diagram of an electrical motor and a hydraulic pump connected directly according to one embodiment of the present disclosure. The connection between the electrical motor and the hydraulic pump can be directly connected or connected through other coupling mechanisms.

FIG. 7 provides another example lubricating system. As shown in FIG. 7, the lubricating system includes: at least one first to-be-lubricated member 2-11, wherein an inlet of each of the at least one first to-be-lubricated member 2-11 is connected with a first oil inlet pipe 2-211, and an outlet of the each of the at least first to-be-lubricated member 2-11 is connected with a first oil outlet pipe 2-212; and at least one second to-be-lubricated member 2-12, wherein an inlet of each of the at least one second to-be-lubricated member 2-12 is connected with a second oil inlet pipe 2-213, and an outlet of the each of the at least one second to-be-lubricated member 2-12 is connected with a second oil outlet pipe 2-214. A working/operational pressure of the each of the at least one first to-be-lubricated member 2-11 is different from a working/operational pressure of the each of the at least one second to-be-lubricated member 2-12.

The lubricating system of the disclosure includes the at least one first to-be-lubricated member 2-11 and the at least one second to-be-lubricated member 2-12, the working/operational pressure of the each of the at least one first to-be-lubricated member 2-11 is different from the working/operational pressure of the each of the at least one second to-be-lubricated member 2-12, and the working/operational pressure of the each of the at least one first to-be-lubricated member 2-11 may be less than the working/operational pressure of the each of the at least one second to-be-lubricated member 2-12 such that the lubricating system fully and adaptively lubricates the to-be-lubricated members having different pressures. Such differentiation helps reduce insufficient lubrication as a result of different/disparate lubricating oil pressure ranges requirement of all the to-be-lubricated members, thereby providing effective lubrication in a diverse set of components.

In some embodiments, the first to-be-lubricated member 2-11 and the second to-be-lubricated member 2-12 may be different working/operational members/components in a plunger pump.

In some embodiments, the lubricating system further includes: an oil tank 2-30, with which the first oil inlet pipe 2-211, the first oil outlet pipe 2-212, the second oil inlet pipe 2-213 and the second oil outlet pipe 2-214 are all in communication with the oil tank 2-30; and a heating circuit 2-40, whose inlet (input) and outlet (output) are both in communication with the oil tank 2-30.

In some example implementations, the oil tank 2-30 provides lubricating oil for the first to-be-lubricated member 2-11 and the second to-be-lubricated member 2-12 for lubrication. The lubricating oil flows out from the oil tank 2-30, passes through the first oil inlet pipe 2-211 and the second oil inlet pipe 2-213, and reaches the first to-be-lubricated member 2-11 and the second to-be-lubricated member 2-12. Then, the lubricating oil flows out from the first to-be-lubricated member 2-11 and the second to-be-lubricated member 2-12 respectively to the first oil outlet pipe 2-212 and the second oil outlet pipe 2-214, and finally flows back to the oil tank 2-30.

In some example implementations, the heating circuit 2-40 may be a component that independently operates in a low-temperature cold situation. When an external environment is over cold, a temperature of the lubricating oil in the oil tank 2-30 is reduced. In such cases, the lubricating oil may be quickly heated by means of the heating circuit 2-40, so as to quickly heat the lubricating oil to temperature conditions/levels suitable for lubricating the first to-be-lubricated member and the second to-be-lubricated member.

In some embodiments, the lubricating system further includes: a first pump 2-22 disposed on the first oil inlet pipe 2-211; a first driving member 2-23 in drive connection with the first pump 2-22; a first controller 2-24 in communication with the first driving member 2-23; and a first pressure sensor 2-25 disposed at the inlet of the each of the at least one first to-be-lubricated member 2-11, the first pressure sensor 2-25 being in communication with the first controller 2-24.

In some embodiments, the lubricating system further includes: a third pump 2-81 disposed on the second oil inlet pipe 2-213; a third driving member 2-82 in driving connection with the third pump 2-81; a third controller 2-83 in communication with the third driving member 2-82; and a second pressure sensor 2-84 disposed at the inlet of the each of the at least one second to-be-lubricated member 2-12, the second pressure sensor 2-84 being in communication with the third controller 2-83.

In some example implementations, the first pump 2-22 and the third pump 2-81 may be both constant-displacement pumps. The first driving member 2-23 and the third driving member 2-82 may both be variable-frequency electric motors. The first controller 2-24 and the third controller 2-83 may be both programmable logic controllers (PLC).

In some example implementations, the lubricating system may further include a first control valve 2-26 disposed on the first oil inlet pipe 2-211 and positioned between the first pump 2-22 and an inlet of the first oil inlet pipe 2-211.

In some example implementations, the lubricating system may further include a third control valve 2-85 disposed on the second oil inlet pipe 2-213 and positioned between the third pump 2-81 and an inlet of the second oil inlet pipe 2-213.

In some example implementations, the first control valve 2-26 and the third control valve 2-85 may both be implemented as switch butterfly valves for controlling connection and disconnection of the first oil inlet pipe 2-211 and the second oil inlet pipe 2-213.

In some example implementations, the lubricating system further includes a first filtering member 2-27 disposed on the first oil inlet pipe 2-211 and positioned between the first control valve 2-26 and the inlet of the first oil inlet pipe 2-211.

In some example implementations, the lubricating system may further include a third filtering member 2-86 disposed on the second oil inlet pipe 2-213 and positioned between the third control valve 2-85 and the inlet of the second oil inlet pipe 2-213.

In some example implementations, with the first to-be-lubricated member 2-11 being the plunger pump as an example, the lubricating oil in the oil tank 2-30 enters the first oil inlet pipe 2-211. Before the plunger pump is in operation, the first control valve 2-26 is opened, and then the first driving member 2-23 is started, so as to drive the first pump 2-22 to circularly suck/draw and discharge lubrication oil. When the first pump 2-22 is in operation, a displacement and a rotating speed of the first pump 2-22 depend on a pressure signal fed back to the first controller 2-24 by the first pressure sensor 2-25. After detecting the pressure signal fed back, the first controller 2-24 outputs a corresponding frequency to adjust a working rotating speed of the first driving member 2-23, such that the first driving member 2-23 automatically adjusts the rotating speed in real time under the influence of increase in a working oil temperature and gradual reduction of viscosity of the lubricating oil, so as to ensure that a lubricating pressure does not exceed a working/operational pressure range of the plunger pump, that an inlet pressure of the plunger pump is stable, and that the operation requirement is satisfied. Moreover, the lubricating system may be further configured with overload protection. When a current of the first driving member 2-23 exceeds a threshold current (predefined, for example), a program/circuitry will carry out automatic protective measures. That is, a control system will be triggered to give an instruction to the first driving member 2-23, so as to enable the first driving member 2-23 to automatically reduce a rotating speed to be lower than that of the threshold current, such that it is ensured that the first driving member 2-23 operates in a stable/safe manner, thereby reducing or avoiding damage to the first driving member. A lubricating process of the second to-be-lubricated member 2-12 for lubricating another component of the fracturing system is similar to that of the first to-be-lubricated member 2-11.

In some example implementations, the lubricating system further includes a first overflow valve 2-29 disposed on the first oil outlet pipe 2-212.

In some example implementations, the lubricating system further includes a third overflow valve 2-87, the third overflow valve 2-87 being disposed on the second oil outlet pipe 2-214.

In some example implementations, the first overflow valve 2-29 is disposed on the first oil outlet pipe 2-212, and the third overflow valve 2-87 is disposed on the second oil outlet pipe 2-214, so as to further prevent pressures of lubricating members from exceeding a limit value.

In some example implementations, by disposing the first overflow valve 2-29 and the third overflow valve 2-87, the quantity of the lubricating oil and pressure are automatically adjusted, power of the first driving member 2-23 and the third driving member 2-82 are fully and effectively used, and waste of power is minimized.

In some example implementations, a pipe filter 2-70 is disposed on the first oil inlet pipe 2-211, the pipe filter 2-70 being positioned between the first pump 2-22 and the inlet of the first to-be-lubricated member 2-11, so as to filter the passing lubricating oil. The pipe filter 2-70 has a filter element blockage alarm function. When a differential pressure alarm of the pipe filter 2-70 detects that a front-back (or input-output) differential pressure of the pipe filter 2-70 is greater than a set value, a signal will be transmitted to the control system, and at the moment, the control system will give an early warning instruction via a popup message on a display interface, so as to prompt early blockage warning. Whenever a filter element is blocked by impurities after working/operating for an extended period of time, a control program will give a blockage alarm to prompt an operator to replace or unblock the filter element, so as to prevent the situation of insufficient lubrication caused by pipe blockage. Similarly, a pipe filter 2-70 may be disposed on the second oil inlet pipe 2-213. The pipe filter 2-70 being positioned between the third pump 2-81 and the inlet of the second to-be-lubricated member 2-12.

In some example implementations, the working/operational pressure of the each of the at least one first to-be-lubricated member 2-11 may be less than the working/operational pressure of the each of the at least one second to-be-lubricated member 2-12. The lubricating system comprises a radiator 2-51. The radiator 51 is disposed on the first oil inlet pipe 2-211. The lubricating system further includes a first temperature sensor 2-52 for detecting a temperature of lubricating oil in the first oil inlet pipe 2-211, the first temperature sensor 2-52 being in communication with the radiator 2-51.

In some example implementations, the radiator 2-51 is positioned between the pipe filter 2-70 on the first oil inlet pipe 2-211 and the outlet of the first oil inlet pipe 2-211, wherein the outlet of the first oil inlet pipe 2-211 is in communication with the inlet of the first to-be-lubricated member 2-11. After passing through the first pump 2-22, the lubricating oil first passes through the pipe filter 2-70 and then passes through the radiator 2-51, so as to prevent impurities in an oil circuit from damaging the radiator.

In some example implementations, a joint/port between the first temperature sensor 2-52 and the first oil inlet pipe 2-211 is positioned between the radiator 2-51 and the inlet of the first to-be-lubricated member 2-11.

In some example implementations, the radiator 2-51 and the first temperature sensor 2-52 are disposed on the first oil inlet pipe 2-211. After the plunger pump, for example, operates for a long time, the temperature of the lubricating oil will gradually increase. If no auxiliary heat dissipation is carried out, viscosity of the lubricating oil will be gradually reduced, and even failure of the lubricating oil may occur. In this case, the first temperature sensor 2-52 may be disposed at an inlet requiring low-pressure lubrication to transmit a detected temperature signal to the first controller 2-24. After receiving the detected temperature signal, the first controller 2-24 sends an instruction to the radiator 2-51, the program/circuitry will compare a set heat dissipation temperature threshold with the detected temperature signal fed back, and when a detected temperature reaches the set threshold value, the radiator 2-51 is set in operation to dissipate heat of the whole lubricating system, so as to control a temperature of the lubricating system within a reasonable working range.

In some example implementations, since the lubricating system is provided with the first oil inlet pipe 2-211 and the second oil inlet pipe 2-213, in common arrangements, radiators may be disposed in the first oil inlet pipe 2-211 and the second oil inlet pipe 2-213. However, in some examples of the lubricating system of the disclosure, considering that a main source of heat dissipation power of the system is to dissipate heat generated by operation of the plunger pump, and according to design and computation, the double-radiator implementations above may be modified to implement a single radiator in the first oil inlet pipe 2-211 to meet the heat dissipation requirement of the lubricating system. For the second oil inlet pipe 2-213 having a relatively high pressure, a conventional radiator 2-51 with a low pressure resistance value may not be suitable. Specifically, such a radiator applied in the second oil inlet pipe 2-213 of a high pressure may require additional volume, which would require changes in the structures and materials of internal members of the radiator, leading to occupation of additional space/volume. In addition, in the second oil inlet pipe 2-213 having a high pressure, the quantity of required lubricating oil is low, and one of the influencing factors of the heat dissipation power of the radiator 2-51 is related to the quantity of oil entering the radiator 2-51, while the first oil inlet pipe 2-211 having a low pressure requires a large quantity of lubricating oil, such that the heat dissipation power is high. As such, in some example implementations, only the radiator 2-51 may be disposed in the first oil inlet pipe 2-211, with no radiator in the second oil inlet pipe 2-213 to reduce system cost without losing much heat dissipation performance.

In some example implementations, the lubricating system lubricates the plunger pump, a low-pressure to-be-lubricated member includes at least one of a bearing and a reduction gearbox gear, and a high-pressure to-be-lubricated member includes a crankshaft. According to different lubricating pressures and different required flow of different working/operational members/components in the plunger pump, lubrication by the lubricating system is divided into high-pressure lubrication and low-pressure lubrication. A low-pressure lubricating oil circuit mainly provides the lubricating oil for the bearing and the reduction gearbox gear in the plunger pump, and a high-pressure lubricating circuit carries out high-pressure lubrication for the crankshaft of the plunger pump, so as to achieve full and adaptive lubrication during an operation of the plunger pump. Such principle may be expanded to implement three to more different adaptive lubrication pressure ranges.

In some example implementations, the heating circuit 2-40 includes: a second overflow valve 2-41; and a pipe heater 2-42 disposed between the second overflow valve 2-41 and an outlet of the heating circuit 2-40.

In some example implementations, the second overflow valve 2-41 is a heating member in the whole heating circuit 2-40, and is further a key element for heat generation and increase in oil temperature of the heating circuit 2-40. Due to characteristics of the second overflow valve 2-41, the lubricating oil passes through an oil passage in the second overflow valve 2-41 to generate resistance for throttling, such that a heating circuit operates to generate heat. Moreover, the lubricating oil exchanges heat with cold lubricating oil, such that the oil temperature is increased.

In some example implementations, since the oil tank 2-30 has an automatic heat dissipation process in a natural state, considering the heat loss in this process, the tank heater 2-60 and the pipe heater 2-42 are added in the oil tank 2-30 and in a pipe respectively, such that the oil in the oil tank 2-30 and in the pipe is continuously and circularly heated, thereby further improving effective heating.

In some example implementations, the heating circuit 2-40 further includes: a pipe heater 2-42; a second driving member 2-44 in drive connection with the second pump 2-43; a second controller 2-45 in communication with the second driving member 2-44; and a second temperature sensor 2-46 disposed in the oil tank 2-30, the second temperature sensor 2-46 being in communication with the second controller 2-45.

In some example implementations, the second pump 2-43 is a constant-displacement pump, the second driving member 2-44 is a variable-frequency motor, and the second controller 2-45 is a PLC.

In some embodiments, the lubricating system further includes a tank heater 2-60 disposed in the oil tank 2-30.

In some example implementations, the tank heater 2-60 is disposed in the oil tank 2-30 and is used for heating the lubricating oil in the oil tank 2-30, so as to assist rapid increase in the oil temperature in the heating circuit 2-40. Starting and stopping of the tank heater 2-60 are not directly related to starting and stopping of the second driving member 2-44 in the heating circuit, and starting and stopping of the tank heater 2-60 are auxiliary measures for heating the lubricating oil.

In some example implementations, according to a temperature of the lubricating oil detected by the second temperature sensor 2-46, opening and closing of the second overflow valve 41 and starting and stopping the pipe heater 2-42 and the tank heater 2-60 are controlled by a person or a control system.

In some example implementations, in winter, after start-up, heating is carried out. For example, the second temperature sensor 2-46 feeds back a detected temperature signal of the oil tank 2-30 to the second controller 2-45, after receiving the detected temperature signal feedback, the second driving member 2-44 carries out start-up heating, and meanwhile, a current value of the second driving member 44 is synchronously monitored. Since in an initial heating process, the oil is viscous, and overload is likely to occur, the current value is required to be synchronously monitored to ensure that the second driving member 2-44 works without overload. After the detected temperature signal feedback and a working current signal of the second driving member 2-44 are received, a rotating speed of the second driving member 2-44 is automatically adjusted, so as to realize high-efficiency heating by overflow of the second overflow valve 2-41 and instant heating of the pipe heater 2-42. Since the oil tank 2-30 has an automatic heat dissipation process in a natural state, considering the heat loss in this process, the tank heater 2-60 and the pipe heater 2-42 are added in the oil tank 2-30 and in a pipe respectively, such that the oil in the oil tank 2-30 and in the pipe is continuously and circularly heated, thereby further improving a heating effect and prolonging heating time.

In some example implementations, the heating circuit 2-40 further includes a second filtering member 2-47 and a second control valve 2-48. The second control valve 2-48 is positioned between the inlet of the heating circuit 2-40 and the second pump 2-43, and the second control valve 2-48 is used for connecting or disconnecting the heating circuit 2-40. The second filtering member 2-47 is disposed on one side, away from the second pump 2-43, of the second control valve 2-48 to filter passing lubricating oil.

The arrangement of the heating circuit 2-40 above produces the following beneficial effects:

The heating circuit 2-40 can automatically detect a temperature of the lubricating oil and can adjust the corresponding rotating speed and power according to a control current so as to heat the lubricating oil. It helps efficiently carry out rapid start-up heating with overload prevention so as to greatly shorten heating time, and to improve construction efficiency of a working site. Moreover, operation of the heating circuit and operation of a lubricating circuit are carried out synchronously without interference.

It should be noted that the terms "first", "second", etc., in the description and claims of the disclosure and in the accompanying drawings, are used to distinguish between similar objects and not necessarily to describe a particular order or sequential order. It should be understood that data used in this way can be interchanged under appropriate circumstances, such that the embodiment of the disclosure described herein are implemented in a sequence other than those illustrated or described herein. Moreover, the terms "include" and "have" as well as any variations thereof are intended to mean covered and non-exclusive inclusion, for example, a process, a method, a system, a product or equipment including a series of steps or units are not required to be limited by those explicitly listed, but can include other steps or units not explicitly listed or inherent to these processes, methods, products or equipment.

For ease of description, spatial relative terms such as "over", "above", "on an upper surface" and "on" are used herein to describe spatial positional relations of one device or feature with other devices or features as shown in the figures. It should be understood that the spatial relative terms are intended to include different orientations in use or operation in addition to the orientations of the devices described in the figures. For example, if the device in the accompanying drawings is inverted, the device described as "above" or "over" other devices or structures would then be positioned "below" or "under" the other devices or structures. Thus, the illustrative term "above" includes two orientations of "above" and "below." The device can also be positioned in other different ways (being rotated by 90 degrees or being positioned at other orientations) and the spatial relative description used herein is interpreted accordingly.

It will be appreciated to persons having ordinary skill in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A lubricating system, comprising:
at least one first component, wherein an inlet of each of the at least one first component is connected with a first lubrication oil inlet pipe, and an outlet of the each of the at least one first component is connected with a first lubrication oil outlet pipe;
at least one second component, wherein an inlet of each of the at least one second component is connected with a second lubrication oil inlet pipe, and an outlet of the each of the at least one second component is connected with a second lubrication oil outlet pipe, wherein an operating pressure of the each of the at least one first component is different from that of the each of the at least one second component;
a lubrication oil tank, wherein the first lubrication oil inlet pipe, the first lubrication oil outlet pipe, the second lubrication oil inlet pipe and the second lubrication oil outlet pipe are all in communication with the lubrication oil tank; and
a heating circuit comprising a pipe heater and a tank heater, wherein the tank heater is in the lubrication oil tank, and wherein an inlet of the heating circuit and an outlet of the heating circuit are both in communication with the lubrication oil tank.

2. The lubricating system of claim 1, further comprising:
a first pump disposed on the first lubrication oil inlet pipe;
a first driving member for the first pump;
a first controller in communication with the first driving member; and
a first pressure sensor disposed at the inlet of the each of the at least one first component, the first pressure sensor being in communication connection with the first controller.

3. The lubricating system of claim 2, further comprising:
a first control valve disposed on the first lubrication oil inlet pipe and positioned between the first pump and an inlet of the first lubrication oil inlet pipe.

4. The lubricating system of claim 3, further comprising:
a first filtering member disposed on the first lubrication oil inlet pipe and positioned between the first control valve and the inlet of the first lubrication oil inlet pipe.

5. The lubricating system of claim 4, wherein:
the operating pressure of the each of the at least one first component is less than that of the each of the at least one second component;
the lubricating system comprises a radiator;
the radiator is disposed on the first lubrication oil inlet pipe; and
the lubricating system further comprises a first temperature sensor for detecting a temperature of lubrication oil in the first lubrication oil inlet pipe, the first temperature sensor being in communication with the radiator.

6. The lubricating system of claim 2, wherein:
the operating pressure of the each of the at least one first component is less than that of the each of the at least one second component;
the lubricating system comprises a radiator;
the radiator is disposed on the first lubrication oil inlet pipe; and
the lubricating system further comprises a first temperature sensor for detecting a temperature of lubrication oil in the first lubrication oil inlet pipe, the first temperature sensor being in communication with the radiator.

7. The lubricating system of claim 3, wherein:
the operating pressure of the each of the at least one first component is less than that of the each of the at least one second component;
the lubricating system comprises a radiator;
the radiator is disposed on the first lubrication oil inlet pipe; and
the lubricating system further comprises a first temperature sensor for detecting a temperature of lubrication oil in the first lubrication oil inlet pipe, the first temperature sensor being in communication with the radiator.

8. The lubricating system of claim 1, further comprising:
a first overflow valve disposed on the first lubrication oil outlet pipe.

9. The lubricating system of claim 8, wherein:
the operating pressure of the each of the at least one first component is less than the operating pressure of the each of the at least one second component;
the lubricating system comprises a radiator;
the radiator is disposed on the first lubrication oil inlet pipe; and
the lubricating system further comprises a first temperature sensor for detecting a temperature of lubrication oil in the first lubrication oil inlet pipe, the first temperature sensor being in communication with the radiator.

10. The lubricating system of claim 1, wherein:
the operating pressure of the each of the at least one first component is less than that of the each of the at least one second component;
the lubricating system comprises a radiator;
the radiator is disposed on the first lubrication oil inlet pipe; and
the lubricating system further comprises a first temperature sensor for detecting a temperature of lubricating lubrication oil in the first lubrication oil inlet pipe, the first temperature sensor being in communication with the radiator.

11. The lubricating system of claim 1, wherein the heating circuit comprises:

a second overflow valve, wherein the pipe heater disposed between the second overflow valve and the outlet of the heating circuit;

a second pump;

a second driving member for the second pump;

a second controller in communication with the second driving member component; and a second temperature sensor disposed in the lubrication oil tank, the second temperature sensor being in communication with the second controller.

12. The lubricating system of claim 11, wherein according to a temperature of lubrication oil detected by the second temperature sensor, opening and closing of the second overflow valve and starting and stopping of the pipe heater and the tank heater are controlled by a person or a control system.

13. The lubricating system of claim 1, further comprising:

a third pump disposed on the second lubrication oil inlet pipe;

a third driving member for the third pump;

a third controller in communication with the third driving member; and a second pressure sensor disposed at the inlet of the each of the at least one second component, the second pressure sensor being in communication with the third controller.

14. The lubricating system of claim 13, wherein:

the operating pressure of the each of the at least one first component is less than the operating pressure of the each of the at least one second component;

the lubricating system comprises a radiator;

the radiator is disposed on the first lubrication oil inlet pipe; and the lubricating system further comprises a first temperature sensor for detecting a temperature of lubrication oil in the first lubrication oil inlet pipe, the first temperature sensor being in communication with the radiator.

15. The lubricating system of claim 1, wherein:

the operating pressure of the each of the at least one first component is less than that of the each of the at least one second component;

the lubricating system comprises a radiator;

the radiator is disposed on the first lubrication oil inlet pipe; and the lubricating system further comprises a first temperature sensor for detecting a temperature of lubrication oil in the first lubrication oil inlet pipe, the first temperature sensor being in communication with the radiator.

* * * * *